(12) United States Patent
Jung et al.

(10) Patent No.: US 9,106,740 B2
(45) Date of Patent: Aug. 11, 2015

(54) TRANSFERABLE DEVICE WITH ALTERABLE USAGE FUNCTIONALITY

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA (US); Lowell L. Wood, Jr., Livermore, CA (US); Clarence T. Tegreene, Bellevue, WA (US)

(73) Assignee: The Invention Science Fund I, LLC, Bellevue, WA (US)

(*) Notice: Subject to any disclaimer, the term of this patent is extended or adjusted under 35 U.S.C. 154(b) by 239 days.

(21) Appl. No.: 11/474,074

(22) Filed: Jun. 23, 2006

(65) Prior Publication Data

US 2008/0032682 A1 Feb. 7, 2008

(51) Int. Cl.
| | | |
|---|---|---|
| H04W 12/12 | (2009.01) | |
| H04M 3/42 | (2006.01) | |
| H04M 1/725 | (2006.01) | |
| H04W 12/06 | (2009.01) | |
| H04L 29/06 | (2006.01) | |
| H04M 3/38 | (2006.01) | |

(52) U.S. Cl.
CPC ...... H04M 3/42136 (2013.01); H04M 1/72563 (2013.01); H04W 12/06 (2013.01); H04L 63/0861 (2013.01); H04M 3/38 (2013.01); H04M 2203/053 (2013.01)

(58) Field of Classification Search
CPC .................................................. H04B 1/3816
USPC ................. 455/408, 410, 411, 414.3, 418
See application file for complete search history.

(56) References Cited

U.S. PATENT DOCUMENTS

| | | | |
|---|---|---|---|
| 4,724,537 A | 2/1988 | Monet | |
| 6,044,261 A * | 3/2000 | Kazmi | 455/408 |
| 6,081,893 A | 6/2000 | Grawrock et al. | |
| 6,125,283 A | 9/2000 | Kolev et al. | |
| 6,339,828 B1 | 1/2002 | Grawrock et al. | |
| 6,359,661 B1 | 3/2002 | Nickum | |
| 6,408,389 B2 | 6/2002 | Grawrock et al. | |
| 6,748,543 B1 | 6/2004 | Vilhuber | |
| 6,816,974 B1 | 11/2004 | Nurmi et al. | |
| 6,928,547 B2 | 8/2005 | Brown et al. | |
| 6,981,042 B1 | 12/2005 | Rey | |
| 7,088,988 B2 | 8/2006 | Kelkar et al. | |
| 7,266,371 B1 * | 9/2007 | Amin et al. | 455/419 |
| 7,302,272 B2 * | 11/2007 | Ackley | 455/466 |
| 7,366,552 B2 | 4/2008 | Khoo | |
| 7,395,031 B1 * | 7/2008 | Ritter | 455/77 |
| 7,433,324 B2 * | 10/2008 | Switzer et al. | 370/254 |
| 7,433,676 B2 * | 10/2008 | Kobayashi et al. | 455/408 |
| 7,603,105 B2 * | 10/2009 | Bocking et al. | 455/411 |
| 7,603,108 B2 * | 10/2009 | Sparks et al. | 455/414.1 |

(Continued)

FOREIGN PATENT DOCUMENTS

WO WO 00/33493 A1 * 6/2000 .............. H04H 1/00

*Primary Examiner* — Vladimir Magloire
*Assistant Examiner* — Frank Donado (57) ABSTRACT

A method and device for providing a transferable device with alterable usage functionality includes but is not limited to a method including receiving a request from a user to alter one or more functions of the mobile device, responding to the request from the user by activating a first mode, the first mode to alter the one or more functions on the mobile device, and enabling a remote authentication function to allow the user to remotely alter the first mode to at least a second mode.

41 Claims, 8 Drawing Sheets

(56) References Cited

U.S. PATENT DOCUMENTS

| | | | |
|---|---|---|---|
| 7,613,446 B2 | 11/2009 | Engstrom et al. | |
| 7,623,888 B1* | 11/2009 | Wolter | 455/550.1 |
| 8,014,795 B2 | 9/2011 | Lipovski | |
| 8,145,199 B2 | 3/2012 | Tadayon et al. | |
| 8,150,962 B1 | 4/2012 | Wolter | |
| 2001/0011028 A1 | 8/2001 | Wendelrup | |
| 2002/0022474 A1 | 2/2002 | Blom et al. | |
| 2002/0144007 A1* | 10/2002 | Shteyn | 709/313 |
| 2004/0043763 A1* | 3/2004 | Minear et al. | 455/419 |
| 2004/0063423 A1 | 4/2004 | Kagay, Jr. | |
| 2004/0082322 A1* | 4/2004 | Tani | 455/415 |
| 2004/0110494 A1* | 6/2004 | Cohen et al. | 455/414.1 |
| 2004/0117786 A1 | 6/2004 | Kellerman et al. | |
| 2004/0132438 A1* | 7/2004 | White | 455/418 |
| 2004/0132449 A1* | 7/2004 | Kowarsch | 455/432.1 |
| 2004/0132480 A1* | 7/2004 | Parker et al. | 455/550.1 |
| 2004/0137954 A1 | 7/2004 | Engstrom et al. | |
| 2004/0204028 A1 | 10/2004 | Kotzin | |
| 2004/0261097 A1 | 12/2004 | Hanks | |
| 2005/0009563 A1 | 1/2005 | Stenmark | |
| 2005/0021935 A1 | 1/2005 | Schillings et al. | |
| 2005/0035848 A1 | 2/2005 | Syed et al. | |
| 2005/0215241 A1 | 9/2005 | Okada | |
| 2005/0266825 A1* | 12/2005 | Clayton | 455/407 |
| 2006/0009265 A1* | 1/2006 | Clapper | 455/565 |
| 2006/0014523 A1* | 1/2006 | Reilly | 455/412.1 |
| 2006/0075230 A1 | 4/2006 | Baird et al. | |
| 2006/0101521 A1 | 5/2006 | Rabinovitch | |
| 2006/0105810 A1* | 5/2006 | Gnuschke | 455/558 |
| 2006/0117010 A1 | 6/2006 | Hakala | |
| 2006/0128408 A1* | 6/2006 | Perttila et al. | 455/466 |
| 2006/0154656 A1 | 7/2006 | Nicolas et al. | |
| 2006/0217106 A1* | 9/2006 | Davidson et al. | 455/405 |
| 2007/0032268 A1 | 2/2007 | Gotfried | |
| 2007/0099609 A1* | 5/2007 | Cai | 455/428 |
| 2007/0202859 A1* | 8/2007 | Ward | 455/414.1 |
| 2007/0203719 A1* | 8/2007 | Kenagy et al. | 705/1 |
| 2007/0245026 A1* | 10/2007 | Martin et al. | 709/227 |
| 2007/0264974 A1* | 11/2007 | Frank et al. | 455/411 |
| 2007/0264981 A1* | 11/2007 | Miller | 455/414.1 |
| 2007/0288752 A1 | 12/2007 | Chan | |
| 2008/0045179 A1* | 2/2008 | Bekanich et al. | 455/405 |
| 2008/0261603 A1 | 10/2008 | Sever et al. | |
| 2009/0163243 A1 | 6/2009 | Barbera | |
| 2010/0087194 A1 | 4/2010 | MacNaughtan et al. | |
| 2010/0201478 A1 | 8/2010 | Veen et al. | |
| 2011/0021234 A1 | 1/2011 | Tibbitts et al. | |
| 2011/0039572 A1 | 2/2011 | Lamb et al. | |
| 2011/0098058 A1 | 4/2011 | Mahalingam | |
| 2011/0105097 A1 | 5/2011 | Tadayon et al. | |
| 2011/0136480 A1 | 6/2011 | Osann, Jr. | |
| 2011/0136509 A1 | 6/2011 | Osann, Jr. | |
| 2011/0171943 A1 | 7/2011 | Raviv | |
| 2011/0212737 A1 | 9/2011 | Isidore | |
| 2011/0294520 A1 | 12/2011 | Zhou et al. | |
| 2012/0064920 A1 | 3/2012 | Shaw | |

* cited by examiner

TRANSFERABLE DEVICE WITH ALTERABLE USAGE FUNCTIONALITY

TECHNICAL FIELD

The present application relates generally to devices that can be transferred with altered functionality.

SUMMARY

In one aspect, a method for a transferable device with alterable usage functionality includes but is not limited to receiving a request from a user to alter one or more functions of the mobile device; responding to the request from the user by activating a first mode, the first mode to alter the one or more functions on the mobile device; and enabling a remote authentication function to allow the user to remotely alter the first mode to at least a second mode. In addition to the foregoing, other method aspects are described in the claims, drawings, and text forming a part of the present application.

In another aspect, a method for a mobile device includes but is not limited to receiving an activation signal to implement a generic mode with reduced functionality; and reducing the functionality of the mobile device in response to the activation signal to enable the mobile device to function without one or more user-personalized features. In addition to the foregoing, other method aspects are described in the claims, drawings, and text forming a part of the present application.

In another aspect, a method for altering available services of a portable device includes but is not limited to receiving a request from a user to alter one or more available services on the portable device, and implementing a fee-based alternative service for each service specified in the request from the user. In addition to the foregoing, other method aspects are described in the claims, drawings, and text forming a part of the present application.

In another aspect, a method for determining usage of a mobile device includes but is not limited to transferring the mobile device, selectively determining which of one or more features to restrict in connection with the transferring the mobile device, and activating an instruction on the mobile device to provide near real-time restriction of the one or more features of the mobile device. In addition to the foregoing, other method aspects are described in the claims, drawings, and text forming a part of the present application.

In another aspect, a method for providing shared usage of a mobile device includes but is not limited to providing a first mode of operation for the mobile device to enable a first user to have access to certain functional aspects of the mobile device, providing a second mode of operation for the mobile device to enable a second user to have access to a subset of the certain functional aspects, and enabling a user-actuated transfer from the first mode of operation to the second mode of operation. In addition to the foregoing, other method aspects are described in the claims, drawings, and text forming a part of the present application.

In another aspect, a method for providing shared usage of a mobile device includes but is not limited to enabling certain functional aspects of the mobile device on behalf of a first primary user, and preventing access by a secondary user to a portion of the certain functional aspects in response to a user-initiated request. In addition to the foregoing, other method aspects are described in the claims, drawings, and text forming a part of the present application.

In another aspect, a computer program product includes but is not limited to a signal bearing medium bearing at least one of one or more instructions for receiving a request from a user to alter one or more functions of the mobile device; one or more instructions for responding to the request from the user by activating a first mode, the first mode to alter the one or more functions on the mobile device; one or more instructions for responding to the request from the user by activating a first mode, the first mode to alter the one or more functions on the mobile device; and one or more instructions for enabling a remote authentication function to allow the user to remotely alter the first mode to at least a second mode. In addition to the foregoing, other computer program product aspects are described in the claims, drawings, and text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer. In addition to the foregoing, other system aspects are described in the claims, drawings, and text forming a part of the present application.

In one aspect, a mobile device includes but is not limited to a processor, a memory coupled to the processor, an activation module configured for receiving a request from a user to alter one or more functions of the mobile device, and a functionality module in communication with the activation module, the functionality module configured for reducing the functionality of the mobile device in response to the activation signal to enable the mobile device to function without one or more user-personalized features.

In addition to the foregoing, other device aspects are described in the claims, drawings, and text forming a part of the present application.

In addition to the foregoing, various other method, system, computer program product, and/or transferable device aspects are set forth and described in the text (e.g., claims and/or detailed description) and/or drawings of the present application. The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the text set forth herein.

BRIEF DESCRIPTION OF THE DRAWINGS

A better understanding of the subject matter of the application can be obtained when the following detailed description of the disclosed embodiments is considered in conjunction with the following drawings, in which.

DETAILED DESCRIPTION OF THE DRAWINGS

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those of skill in the art will appreciate that some of the acts and operations described hereinafter can also be implemented in hardware, software, and/or firmware and/or some combination thereof.

The disclosures provided herein relate to a device that can be transferred with altered functions. In one or more embodiments, the device can be implemented by a transferable device configured as a computing system, a cellular device such as a cellular phone or other form of wireless telephone. The computing system can be networked or otherwise coupled to a source of data, such as via a connection to a database to acquire data necessary for implementing embodiments disclosed herein.

Figure 1:
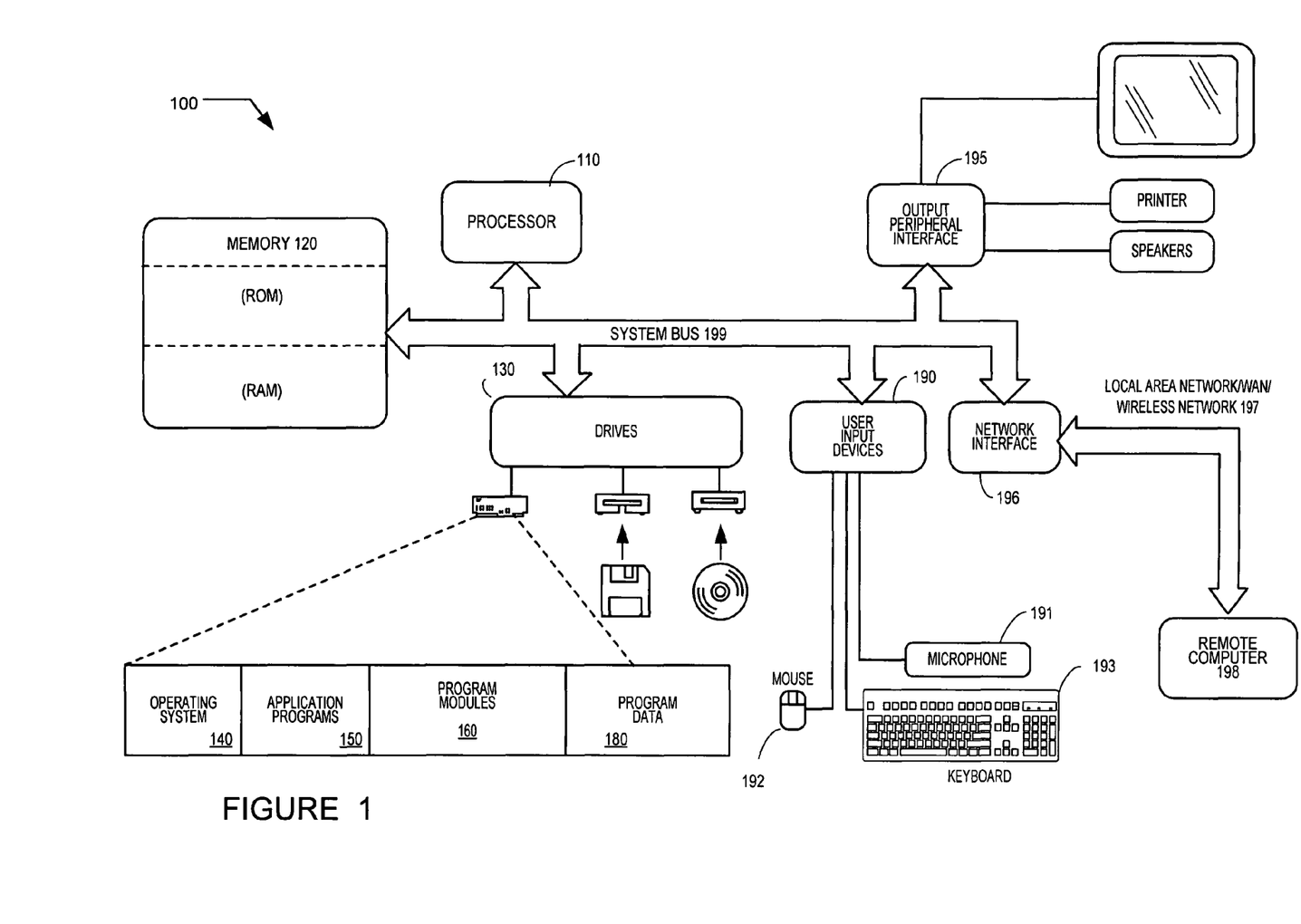
FIG. 1 is a block diagram of an exemplary computer architecture that supports the claimed subject matter of the present application.
Figure 2:
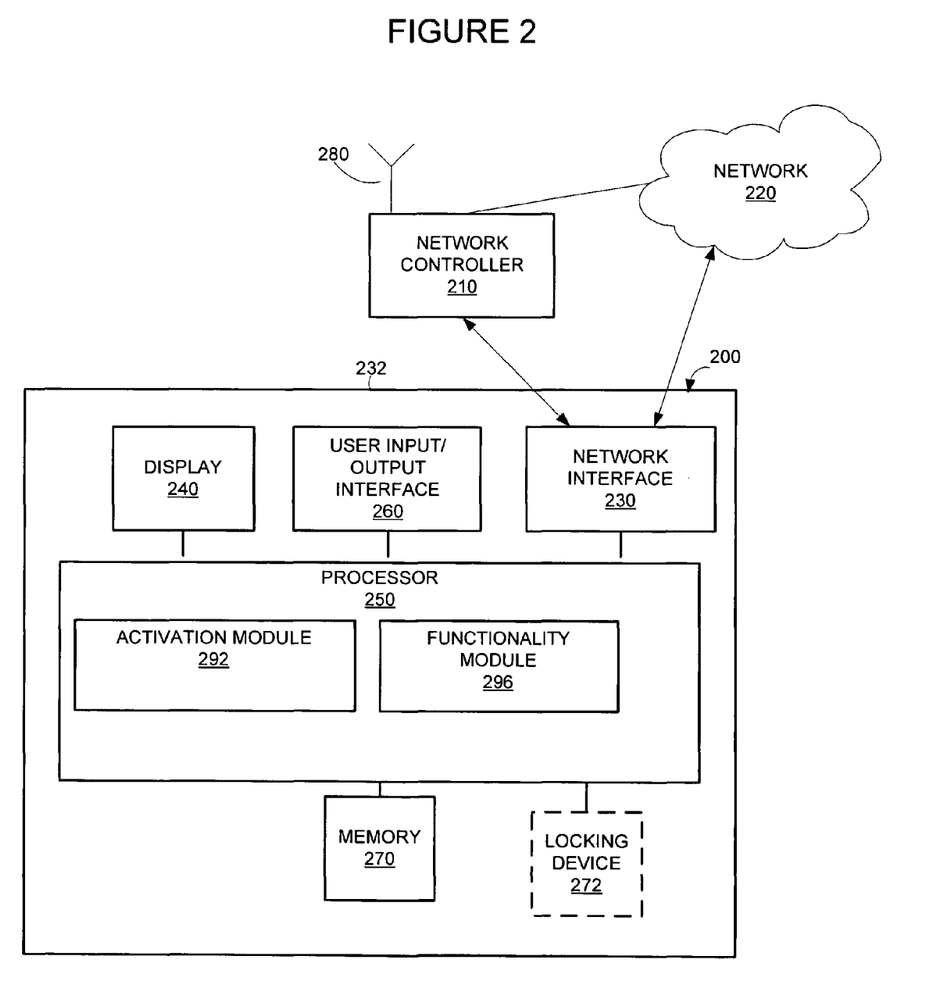
FIG. 2 is a block diagram of a transferable device that supports the claimed subject matter of the present application.

With reference to FIG. 1, depicted is an exemplary computing system for implementing embodiments. FIG. 1 includes a computer 100, including a processor 110, memory 120 and one or more drives 130. The drives 130 and their associated computer storage media provide storage of computer readable instructions, data structures, program modules and other data for the computer 100. Drives 130 can include an operating system 140, application programs 150, program modules 160, which can include an activation module 292 and/or a functional module 296 as depicted in FIG. 2, and program data 180. Computer 100 further includes user input devices 190 through which a user may enter commands and data. Input devices can include an electronic digitizer, a microphone 191, a keyboard 193 and pointing device, commonly referred to as a mouse 192, trackball or touch pad. Other input devices may include a joystick, a game pad, a satellite dish, a scanner, or the like.

These and other input devices can be connected to processor 110 through a user input interface such as user input devices 190 that is coupled to a system bus 199, but may be connected by other interface and bus structures, such as a parallel port, a game port or a universal serial bus (USB) or network interface 196. Computers such as computer 100 may also include other peripheral output devices such as speakers, which may be connected through an output peripheral interface 195 or the like. More particularly, output devices can include personal digital assistant type devices networked to computer 100 to enable on-the-fly functional assistance.

Computer 100 may operate in a networked environment using logical connections to one or more computers, such as a remote computer 198 connected to network interface 196 via network 197. Remote computer 198 may be a personal computer, a server, a router, a network PC, a peer device or other common network node, and can include many or all of the elements described above relative to computer 100. Networking environments are commonplace in offices, enterprise-wide computer networks, intranets and the Internet. For example, in the subject matter of the present application, computer 100 may comprise the source machine from which data is being migrated, and the remote computer may comprise the destination machine. Note however, that source and destination machines need not be connected by a network or any other means, but instead, data may be migrated via any media capable of being written by the source platform and read by the destination platform or platforms. When used in a local area network (hereinafter referred to as "LAN") or a wide area network (hereinafter referred to as "WAN") networking environment, computer 100 is connected to the LAN through a network interface 196 or an adapter. When used in a WAN networking environment, computer 100 typically includes a modem or other means for establishing communications over the WAN, such as the Internet. It will be appreciated that other means of establishing a communications link between the computers may be used.

Referring now to FIG. 2, illustrated is an exemplary block diagram of a mobile device 200, which can be implemented as a mobile computer system, such as computer system 100, a wireless telephone, a cellular telephone, a personal digital assistant or any processor-enabled system. Mobile device 200 can optionally include a network controller 210 which can be coupled to network 220 and to network interface 230. Network 220 may include a data network, such as the Internet, an intranet, a LAN, a WAN, a cable network, and other like communication systems.

Network 220 may also include a telecommunications network, such as a local telephone network, a long distance telephone network, a cellular telephone network, a satellite communications network, a cable television network and other like communications systems that interact with computer systems. Network 220 may include more than one network and may include a plurality of different types of networks. Network controller 210 can be configured to receive requests over network 220 and/or directly from network interface 230 disposed within mobile device 200. In one embodiment, network controller 210 is a controller operable with a wireless communication system, such as a cellular system. Network controller 210 can be responsive to or initiate service provider requests received from network 220 or from another source coupled to network controller 210. Network controller 210 can be configured with a remote authentication function and one or more controller functions to alter and/or restrict one or more functions of a mobile device 200 in communication with the network 220 or directly with network controller 210. The one or more functions controllable with network controller 210 can include functions defining a base function set of a mobile device, defining one or more modes of functionality for a mobile device and the like. In one embodiment, network controller 210 is coupled to a transmitter 280 configured to transmit to mobile device 200, for example, to connect to network interface 230.

Mobile device 200 can include a housing 232, a processor 250, a display 240 coupled to processor 250, a user input/output interface 260 coupled to processor 250, and a memory 270, the memory coupled to the processor 250. According to an embodiment, memory 270 can include a random access memory, a read-only memory, an optical memory, a subscriber identity module memory, or any other memory that can be coupled to a communication device. Display 240 can be a liquid crystal display (LCD), a light emitting diode (LED) display, a plasma display, a touch-sensitive display or any other means for enabling visual access of information. User input/output interface 260 can include a keypad, buttons, a touch pad, a joystick, touch sensitive screen, an additional display, or any other device useful for providing an interface between a user and an electronic device.

Mobile device 200 further includes an activation module 292, which can be coupled to processor 250, and located either within the processor, and/or located in memory 270. In one embodiment, activation module 292 can be an activation module configured for receiving a request from a user to alter one or more functions of the mobile device. In one embodiment, activation module 292 is configured to respond to locking device 272 which can operate to determine functionality of mobile device 200

In one embodiment, mobile device 200 further includes a functionality module 296. Functionality module 296 can be configured as a functionality module in communication with the activation module, the functionality module configured for reducing the functionality of the mobile device in response to the activation signal to enable the mobile device to function without one or more user-personalized features. Like activation module 292, functionality module 296 can be configured to operate with locking device 272. More specifically, locking device 272 can be configured to operate with display 240 to determine which functions to enable or which mode to enable on the mobile device 200.

Figure 3:
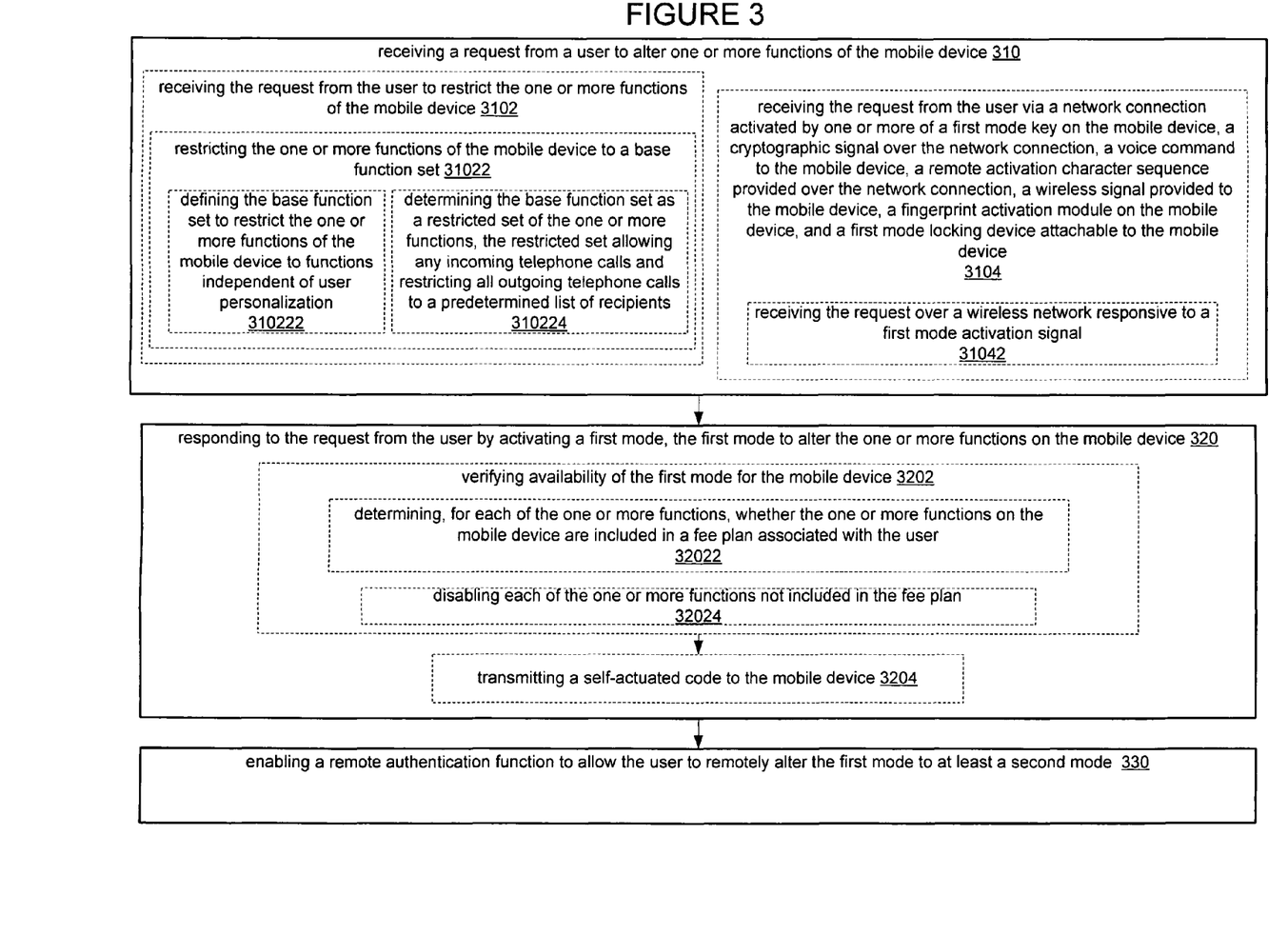
FIG. 3 illustrates a flow diagram of a method in accordance with an embodiment of the subject matter of the present application.

Referring now to FIG. 3, an exemplary flow diagram illustrates the operation of the mobile device 200. Block 310 provides for receiving a request from a user to alter one or more functions of the mobile device (e.g., mobile device 200 and/or network controller 210 receiving a request over network 220 to alter functions of mobile device such as mobile device 200). For example a user operating mobile device 200 could wish to transfer the device to a friend or other person and desire to enable the friend use of a phone without access to private information stored on the device. A service provider would then receive the request to alter functions on the mobile device.

Depicted within block 310 is optional block 3102, which provides for receiving the request from the user to restrict the one or more functions of the mobile device, (e.g., network controller 210 receiving data from a user to restrict functions of mobile device 200 via a network 220). A user who uses a mobile device 200 implemented as a cellular phone, for example, could allow another user to use only the phone functions of the device.

Further depicted within block 3102 is optional block 31022 which provides for restricting the one or more functions of the mobile device to a base function set, (e.g. network controller 210 restricting functions of a mobile device to base functions). Base functions could include the base functions for which a device is intended or the like. A mobile telephone, a mobile DVD player and other mobile devices may have a base function set and additional functions that are more processor intensive, fee intensive, or susceptible to personalization. The restriction to a base function set would then reduce the device to avoid concern for other functionalities of the device.

Further depicted within block 31022 is optional block 310222 which provides for defining the base function set to restrict the one or more functions of the mobile device to functions independent of user personalization (e.g., network controller 210 using user determined personalization to determine which functions of a mobile device are included in a base function set). For example a user may have highly personal information stored on a mobile device that the user desires to hide. A personal journal, phonebook, pictures and other personal functions on the mobile device would thereby be restricted by reducing the device to a base function set.

Block 31022 also includes optional block 310224 with provides for determining the base function set as a restricted set of the one or more functions, the restricted set allowing any incoming telephone calls and restricting all outgoing telephone calls to a predetermined list of recipients (e.g., network controller 210 determining which of the one or more functions are included in a base function set of a cellular telephone). Thus, a transfer of a mobile device could allow a user to make and receive a limited number of telephone calls.

Block 310 further includes optional block 3104 which provides for receiving the request from the user via a network connection activated by one or more of a first mode key on the mobile device, a cryptographic signal over the network connection, a voice command to the mobile device, a remote activation character sequence provided over the network connection, a wireless signal provided to the mobile device, a fingerprint activation module on the mobile device, and a first mode locking device attachable to the mobile device (e.g., network controller 210 receiving a request from a user over network 220 via mobile device 200 or another connection to network 220). The method for activating a network connection to restrict services on the mobile device can include activations on the mobile device and/or away from the mobile device. In one embodiment, on-the-fly type activation of restrictions of the mobile device functions beneficially provides immediate security.

Optional block 3104 depicts optional block 31042, which provides for receiving the request over a wireless network responsive to a first mode activation signal (e.g., network controller 210 receiving a request from a user over a network 220 configured as a wireless network).

Block 320 provides for responding to the request from the user by activating a first mode, the first mode to alter the one or more functions on the mobile device (e.g., network controller 210 responding a request received over network 220 to activate the first mode and/or alter functions on mobile device 200). Depicted within block 320 is optional block 3202 which provides for verifying availability of the first mode for the mobile device (e.g., mobile device 200 verifying via network controller 210 availability of the first mode of the mobile device 200).

Block 320 also includes optional block 3204 which provides for transmitting a self-actuated code to the mobile device (e.g., network controller 210 transmitting code to a mobile device such as mobile device 200). The self-actuated code could be implemented to operate with functionality module 296 to automatically or substantially automatically reduce or alter functions of the mobile device 200. Alternatively, the self-actuated code could be configured to operate with locking device 272 to lock or bar functions of the mobile device 200 to a base function set or a generic mode.

Block 3202 includes optional block 32022 and optional block 32024 which provide for determining, for each of the one or more functions, whether the one or more functions on the mobile device are included in a fee plan associated with the user (e.g., network controller 210 operating to determine which functions are included in a user fee plan). Thus, a user can control the fees associated with the mobile device when the user is not in control of the mobile device 200.

Block 32024 provides for disabling each of the one or more functions not included in the fee plan (e.g., network controller 210 operating to disable functions not in the fee plan for a user). A user transferring a mobile device to another user that is independent of a fee structure and not responsible for a fee for the mobile device 200 would be unable to incur additional expense for the user that is the owner and responsible party for mobile device 200.

Block 330 provides for enabling a remote authentication function to allow the user to remotely alter the first mode to at least a second mode (e.g., network controller 210 and/or mobile device 200 enabling remote authentication to alter functionality of mobile device 200 from a first mode to at least a second mode).

Figure 4:
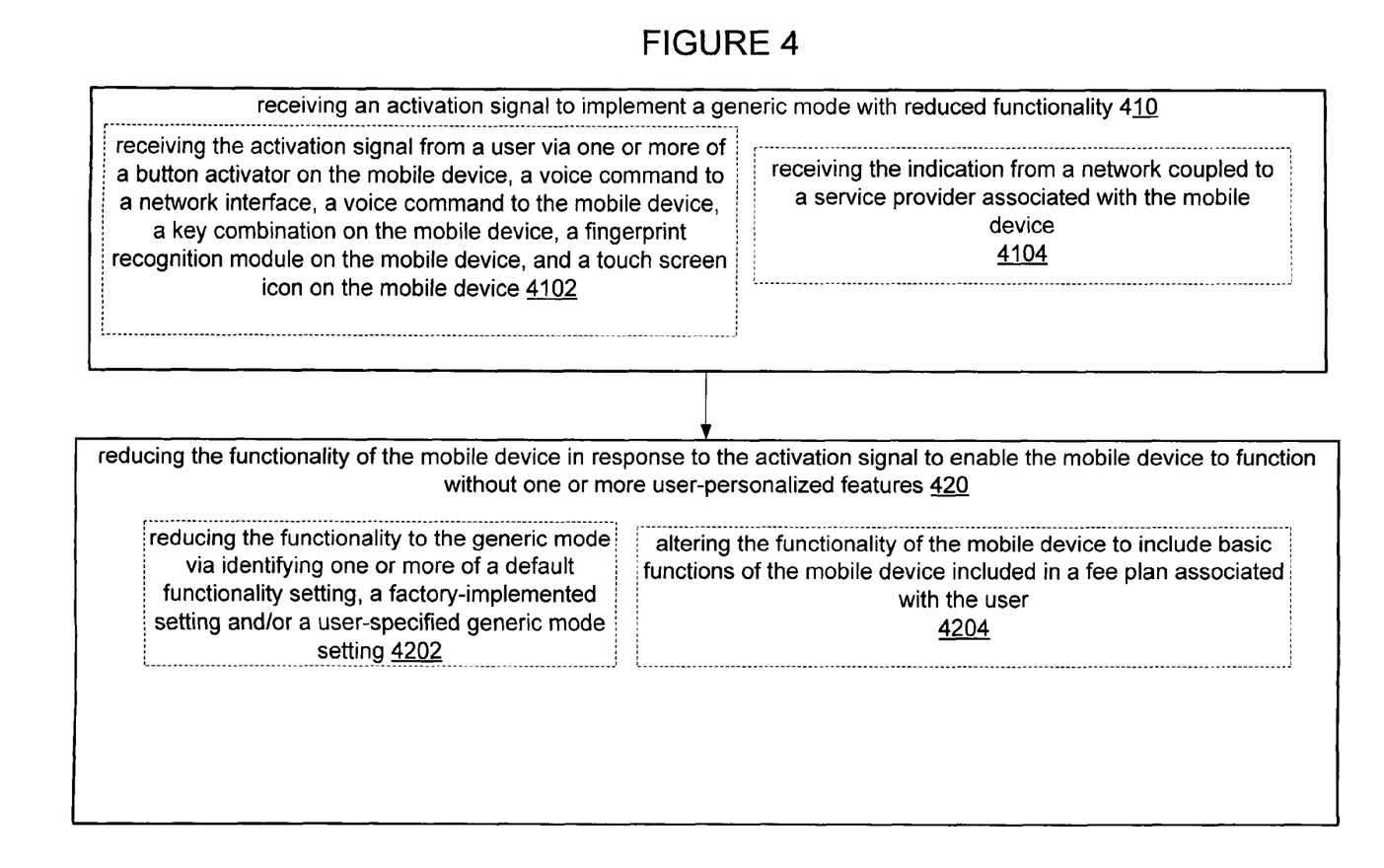
FIG. 4 illustrates a flow diagram of a method in accordance with an embodiment of the subject matter of the present application.

Referring now to FIG. 4, block 410 provides for receiving an activation signal to implement a generic mode with reduced functionality. Block 410 depicts optional blocks 4102 and 4104 therein. Block 4102 provides for receiving the activation signal from a user via one or more of a button activator on the mobile device, a voice command to a network interface, a voice command to the mobile device, a key combination on the mobile device, a fingerprint recognition module on the mobile device, and a touch screen icon on the mobile device (network controller 210 receiving an activation signal). Block 4104 provides for receiving the indication from a network coupled to a service provider associated with the mobile device (e.g., network controller 210 cooperating with a service provider or including a service provider to receive the indication via network 220).

Block 420 provides for reducing the functionality of the mobile device in response to the activation signal to enable the mobile device to function without one or more user-personalized features (e.g., mobile device 200 receiving an activation signal via network 220 in cooperation with network controller 210 that enables the transferable device to function without user personalized features).

Depicted within block 420 is optional block 4202 which provides for reducing the functionality to the generic mode via identifying one or more of a default functionality setting, a factory-implemented setting and/or a user-specified generic mode setting (e.g., mobile device 200 reducing functionality to a generic mode). The generic mode can be a base function set, a generic mode identified by the user to be generic, and/or the generic mode can be a factory base set of functions. Alternatively, the generic mode can include removing and/or altering any personalized additional service features for mobile device 200. The altering can include de-personalizing features to an original state, for example.

Block 420 further includes optional block 4204 which provides for altering the functionality of the mobile device to include basic functions of the mobile device included in a fee plan associated with the user (e.g., network controller 210 sending a signal to mobile device 200 configured as a mobile device that alters the functionality of the mobile device 200 to include basic functions associated with a fee plan of a user).

Figure 5:
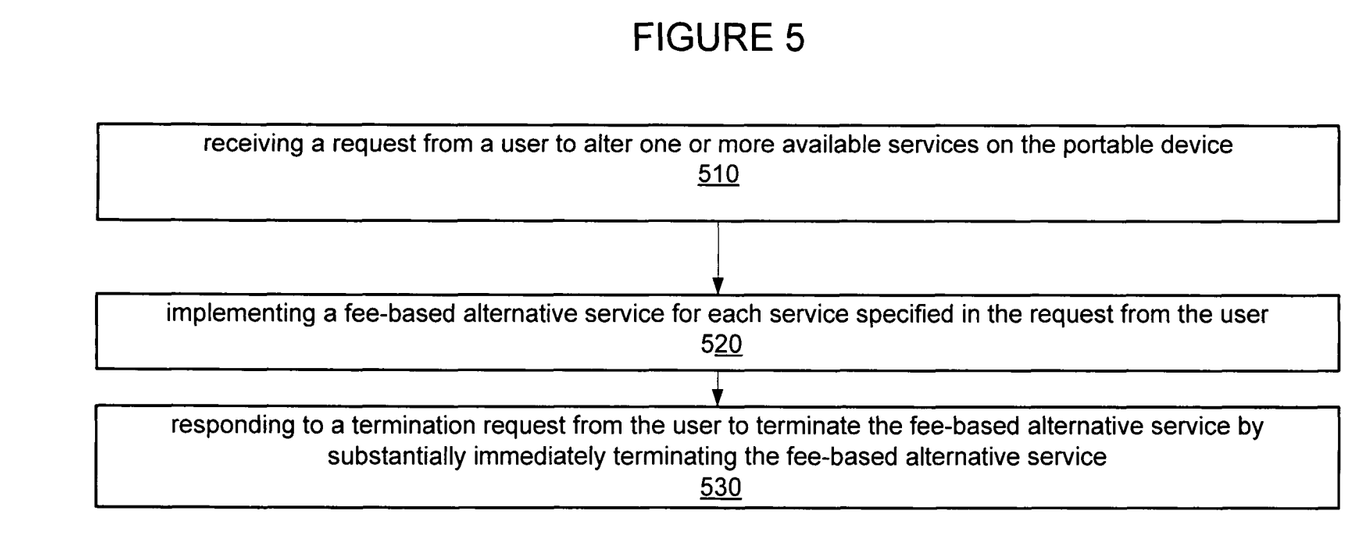
FIG. 5 illustrates a flow diagram of a method in accordance with an embodiment of the subject matter of the present application.

Referring now to FIG. 5, a method for altering available services of a portable device is illustrated. Block 510 provides for receiving a request from a user to alter one or more available services on the portable device (e.g., either network controller 210 or mobile device 200 receiving a request to alter one or more services on a portable device such as mobile device 200).

Block 520 provides for implementing a fee-based alternative service for each service specified in the request from the user (e.g., either network controller 210 or mobile device 200 controlling the functionality in response to receiving a request, and implementing a fee-based alternative service for each service identified in the request).

Block 530 provides for responding to a termination request from the user to terminate the fee-based alternative service by substantially immediately terminating the fee-based alternative service (e.g., either network controller 210 or mobile device 200 responding to a termination request to terminate fee-based alternative services by denying access to the services).

Figure 6:
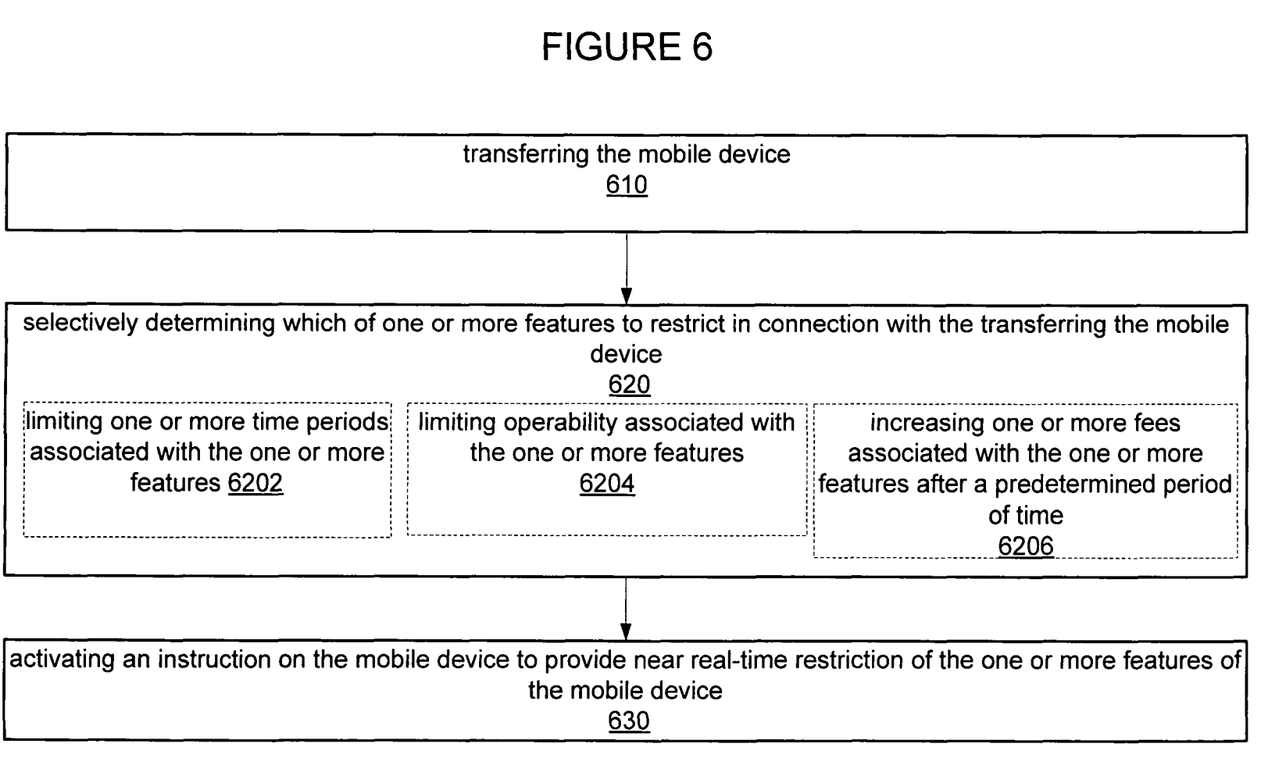
FIG. 6 illustrates a flow diagram of a method in accordance with an embodiment of the subject matter of the present application.

Referring now to FIG. 6, a method for determining usage of a mobile device is illustrated. Block 610 provides for transferring the mobile device (e.g., mobile device 200 being transferred from one user to another user).

Block 620 provides for selectively determining which of one or more features to restrict in connection with the transferring the mobile device (e.g., a user determining which features to restrict on the mobile device 200). Depicted within block 620 is optional block 6202 which provides for limiting one or more time periods associated with the one or more features (e.g., mobile device 200 and/or network controller 210 determining a time period for restricting the one or more features on mobile device 200).

Also depicted within block 620 is optional block 6204 which provides for limiting operability associated with the one or more features (e.g., determining a limit for the features operable on mobile device 200, such as limiting a time period, a fee associated with the features and/or functional aspects of the features according to the limit).

Also depicted within block 620 is optional block 6206 which provides for increasing one or more fees associated with the one or more features after a predetermined period of time (e.g., network controller 210 and/or transferable device controlling a fee structure associated with the one or more features available on mobile device 200 to a predetermined period of time, such as a time associated with limited features or the like).

Block 630 provides for activating an instruction on the mobile device to provide near real-time restriction of the one or more features of the mobile device (e.g., activation module 292 activating an instruction on mobile device 200 to provide real-time restrictions on the features).

Figure 7:
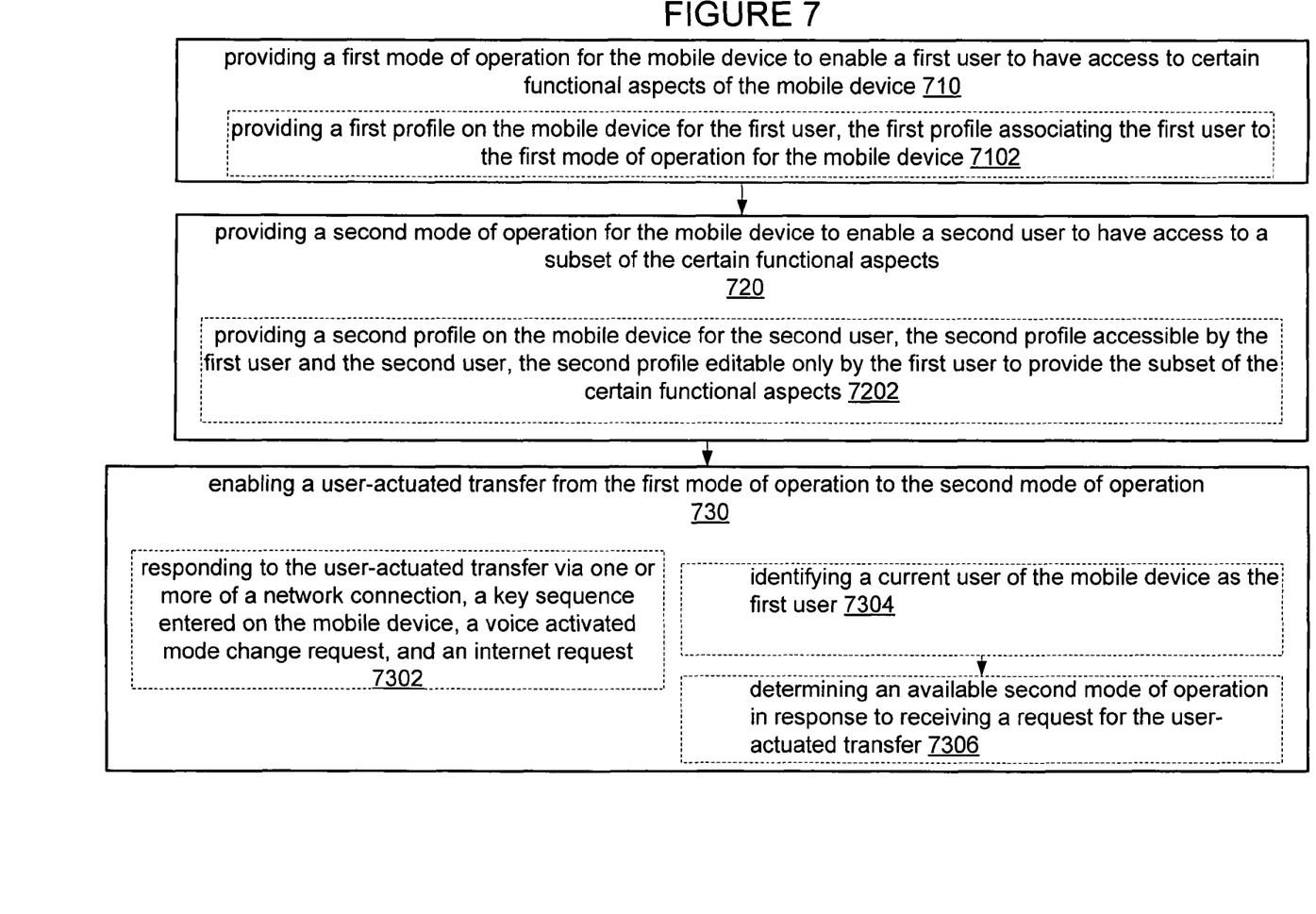
FIG. 7 illustrates a flow diagram of a method in accordance with an embodiment of the subject matter of the present application.

Referring now to FIG. 7, a flow diagram illustrates a method for shared usage of a mobile device. Block 710 provides for providing a first mode of operation for the mobile device to enable a first user to have access to certain functional aspects of the mobile device (e.g., network controller 210 and/or mobile device 200 providing a first mode of operation for a first user, the first mode enabling certain functional aspects). Depicted within block 710 is block 7102, which provides for providing a first profile on the mobile device for the first user, the first profile associating the first user to the first mode of operation for the mobile device (e.g., network controller 210 and/or mobile device 200 enabling a profile for the first user to enable the first user to identify features operable for the mobile device 200).

Block 720 provides for providing a second mode of operation for the mobile device to enable a second user to have access to a subset of the certain functional aspects (e.g., network controller 210 and/or mobile device 200 providing a second mode of operation for mobile device 200 that enables a second user to access some of the functional aspects of the mobile device 200). The second user can include a friend, coworker, or other entity associated with the first user. The second user can have reduced responsibility for the mobile device 200.

Depicted within block 720 is optional block 7202 which provides for providing a second profile on the mobile device for the second user, the second profile accessible by the first user and the second user, the second profile editable only by the first user to provide the subset of the certain functional aspects (e.g., network controller 210 and/or mobile device 200 enabling a second user to set up a second profile accessible to the first user and the second user such that the second profile is controlled by the first user to limit functionality of the mobile device 200). The profiles can be set up over a web interface or directly by a service provider or directly on mobile device 200.

Block 730 provides for enabling a user-actuated transfer from the first mode of operation to the second mode of operation (e.g., network controller 210 and/or mobile device 200 enabling a user, such as first user or second user to actuate a transfer from a first mode of operation to the second mode of operation). Depicted within block 730 is optional block 7302 which provides for responding to the user-actuated transfer via one or more of a network connection, a key sequence entered on the mobile device, a voice activated mode change request, and an internet request (e.g., network controller 210 and/or mobile device 200 responding to the user-actuated transfer by responding to a network connection over network 220, a key sequence entered on mobile device 200, a voice activated mode change request submitted on the mobile device 200 or network controller 210 and/or an internet request made over network 220). Also depicted within block 730 are optional blocks 7304 and 7306. Block 7304 provides for identifying a current user of the mobile device as the first user (e.g., network controller 210 and/or mobile device 200 following an identification protocol to determine if the first user is a current user). Optional block 7306 provides for determining an available second mode of operation in response to receiving a request for the user-actuated transfer (e.g., network controller 210 and/or mobile device 200 determining second mode availability in response to a request for a user-actuated transfer). The available second mode of operation can be determined at the network 220 and/or network controller 210. The service provider operating via network controller 210 determines whether a second mode is stored or available to the first user.

Figure 8:
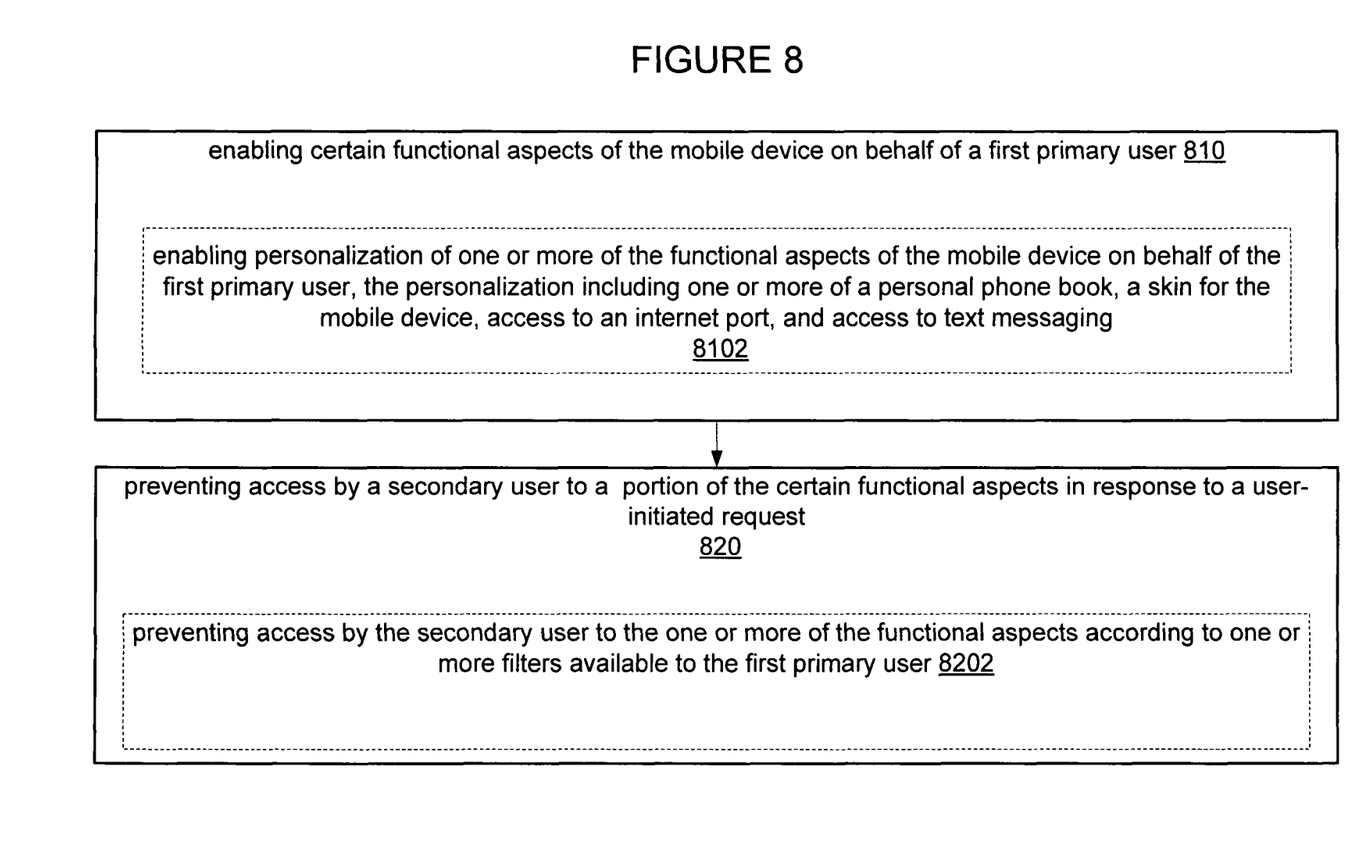
FIG. 8 illustrates a flow diagram of a method in accordance with an embodiment of the subject matter of the present application.

Referring now to FIG. 8, a flow diagram illustrates another method for providing shared usage of a mobile device. Block 810 provides for enabling certain functional aspects of the mobile device on behalf of a first primary user (e.g., network controller 210 and/or mobile device 200 enabling certain functional aspects of a mobile device on behalf of a first primary user). Depicted within block 810 is optional block 8102 which provides that the enabling of certain functional aspects could include enabling personalization of one or more of the functional aspects of the mobile device on behalf of the first primary user, the personalization including one or more of a personal phone book, a skin for the mobile device, access to an internet port, and access to text messaging (e.g., network controller 210 and/or mobile device 200 enabling personalization of the mobile device 200 so that the first primary user has control of a phone book, skin on the mobile device 200, access to the internet and/or text messaging).

Block 820 provides for preventing access by a secondary user to a portion of the certain functional aspects in response to a user-initiated request (e.g., network controller 210 and/or mobile device 200 preventing a secondary user from using certain functional aspects in response to a first user requesting blockage of certain functional aspects). Depicted within block 820 is optional block 8202 which provides for preventing access by the secondary user to the one or more of the functional aspects according to one or more filters available to the first primary user (e.g., network controller and/or mobile device 200 blocking a secondary user from using the one or more functional aspects of the mobile device 200 according to filters available on either the mobile device 200 or available over network 220).

Those with skill in the computing arts will recognize that the disclosed embodiments have relevance to a wide variety of applications and architectures in addition to those described above. In addition, the functionality of the subject matter of the present application can be implemented in software, hardware, or a combination of software and hardware. The hardware portion can be implemented using specialized logic; the software portion can be stored in a memory or recording medium and executed by a suitable instruction execution system such as a microprocessor.

While the subject matter of the application has been shown and described with reference to particular embodiments thereof, it will be understood by those skilled in the art that the foregoing and other changes in form and detail may be made therein without departing from the spirit and scope of the subject matter of the application, including but not limited to additional, less or modified elements and/or additional, less or modified blocks performed in the same or a different order.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into comprehensive devices and/or processes and/or systems via a reasonable amount of experimentation. Those having skill in the art will recognize that examples of such comprehensive devices and/or processes and/or systems might include—as appropriate to context and application—all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc.); or (g) a wired/wireless services entity such as Sprint, Cingular, Nextel, etc.), etc.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

We claim:

1. A method for a mobile device, comprising:
providing a locking device configured to operate with at least one display of the mobile device to indicate accessibility to one or more functions of the mobile device;
providing a first mode for the mobile device, the first mode including at least (a) allowing telephone calls in accordance with a fee plan associated with the mobile device and (b) disabled access to at least one personal phone book of the mobile device;
transferring the mobile device from the first mode to a second mode in response to the locking device attached to the mobile device, the attached locking device at least partially housed by a housing of the mobile device, the second mode including at least enabled access to the at least one personal phone book of the mobile device, the transferring including at least activating a skin for the mobile device associated with the second mode, the activated skin enabling a human to perceive, via at least one display of the mobile device altered by the activated skin, that access to the at least one personal phone book of the mobile device is enabled without viewing the locking device; and
transferring the mobile device from the second mode to the first mode in response to the locking device detached from the mobile device, the mobile device, the transferring including at least deactivating the skin for the mobile device associated with the second mode, the deactivated skin enabling a human to perceive, via the at least one display of the mobile device altered by the deactivated skin, that access to the at least one personal phone book of the mobile device is disabled without viewing the locking device.

2. The method of claim 1, wherein transferring the mobile device from the second mode to the first mode comprises:
receiving a request from a user of the mobile device to restrict access to at least one personal phone book of the mobile device.

3. The method of claim 2, wherein receiving a request from a user of the mobile device to restrict access to at least one personal phone book of the mobile device comprises:
receiving a request from a user of the mobile device to restrict access to at least one phone number accessible by at least one personal phone book of the mobile device.

4. The method of claim 1, wherein transferring the mobile device from the second mode to the first mode comprises:
altering one or more functions of the mobile device to a base function set to restrict the one or more functions of the mobile device to functions independent of user personalization.

5. The method of claim 1, wherein transferring the mobile device from the second mode to the first mode comprises:
reducing the functionality of the mobile device in response to the locking device being detached to enable the mobile device to function without one or more user-personalized features.

6. The method of claim 1, wherein transferring the mobile device from the first mode to a second mode comprises:
enabling certain functional aspects of the mobile device in response to the locking device, including at least enabling personalization of one or more of the functional aspects of the mobile device, the personalization including personalization of at least one personal phone book.

7. The method of claim 1, wherein transferring the mobile device from the first mode to a second mode comprises:
transferring the mobile device from the first mode to the second mode in response to the locking device attached to the mobile device and in accordance with a fee plan associated with the mobile device.

8. The method of claim 1, wherein transferring the mobile device from the first mode to a second mode comprises:
transferring the mobile device from the first mode to the second mode including at least transferring the mobile device to the second mode in accordance with a profile associated with the second mode, the profile capable of being edited via the mobile device to define access to one or more functions of the mobile device.

9. The method of claim 1, wherein transferring the mobile device from the first mode to a second mode comprises:
transferring the mobile device from the first mode to the second mode including at least transferring the mobile device to the second mode in accordance with a profile associated with the second mode, the profile capable of being edited via a web interface to define access to one or more functions of the mobile device.

10. The method of claim 1, wherein transferring the mobile device from the first mode to a second mode comprises:
transferring the mobile device from the first mode to the second mode including at least transferring the mobile device in accordance with a profile associated with the second mode, the profile capable of being edited via at least one system associated with a service provider of the mobile device.

11. The method of claim 1, wherein transferring the mobile device from the first mode to a second mode comprises:
transferring the mobile device from the first mode to the second mode in response to the locking device attached to the mobile device, the attached locking device including at least one memory.

12. The method of claim 1, wherein transferring the mobile device from the first mode to a second mode comprises:
transferring the mobile device from the first mode to the second mode to enable personalization of at least one personal phone book of the mobile device.

13. The method of claim 1, wherein transferring the mobile device from the first mode to a second mode comprises:
transferring the mobile device from the first mode to the second mode to enable access to one or more telephone numbers stored via the at least one phone book of the mobile device.

14. The method of claim 1, wherein transferring the mobile device from the first mode to a second mode comprises:
transferring the mobile device from the first mode to the second mode to enable access to one or more functions of the mobile device according to at least one of a first profile or a second profile on the mobile device, the first profile and second profile of the mobile device capable of being edited to at least one of enable or disable access to a subset of one or more functional aspects of the mobile device.

15. The method of claim 1, wherein transferring the mobile device from the first mode to a second mode in response to the locking device attached to the mobile device comprises:
activating a speaker in conjunction with activating the skin for the mobile device associated with the second mode.

16. A mobile device, comprising:
a processing device;
a housing;
a display;
a locking device receiving arrangement configured to operate with the display to indicate accessibility to one or more functions of the mobile device;

circuitry configured for providing a first mode for the mobile device, the first mode including at least (a) allowing telephone calls in accordance with a fee plan associated with the mobile device and (b) disabled access to at least one personal phone book of the mobile device;

circuitry configured for transferring the mobile device from the first mode to a second mode in response to the locking device attached to the mobile device, the attached locking device at least partially housed by a housing of the mobile device, the second mode including at least enabled access to the at least one personal phone book of the mobile device, the transferring including at least activating a skin for the mobile device associated with the second mode, the activated skin enabling a human to perceive, via at least one display of the mobile device altered by the activated skin, that access to the at least one personal phone book of the mobile device is enabled without viewing the locking device; and circuitry configured for transferring the mobile device from the second mode to the first mode in response to the locking device detached from the mobile device, the transferring including at least deactivating the skin for the mobile device associated with the second mode, the deactivated skin enabling a human to perceive, via the at least one display of the mobile device altered by the deactivated skin, that access to the at least one personal phone book of the mobile device is disabled without viewing the locking device.

17. The mobile device of claim 16, wherein the locking device receiving arrangement configured to operate with the display to indicate accessibility to one or more functions of the mobile device comprises:

a locking device receiving arrangement configured to receive a locking device to enable the mobile device to function with one or more user-personalized features.

18. The mobile device of claim 16, wherein the locking device receiving arrangement configured to operate with the display to indicate accessibility to one or more functions of the mobile device comprises:

a locking device receiving arrangement configured to receive a locking device to determine which mode to enable on the mobile device.

19. The mobile device of claim 16, wherein the locking device receiving arrangement configured to operate with the display to indicate accessibility to one or more functions of the mobile device comprises:

a locking device receiving arrangement configured to receive a locking device to determine which functions of the mobile device to enable.

20. The mobile device of claim 16, wherein the locking device receiving arrangement configured to operate with the display to indicate accessibility to one or more functions of the mobile device comprises:

a locking device receiving arrangement configured to receive a locking device to determine which functions of the mobile device to enable in accordance with a fee plan associated with the mobile device.

21. The mobile device of claim 16, wherein the locking device receiving arrangement configured to operate with the display to indicate accessibility to one or more functions of the mobile device comprises:

a locking device receiving arrangement configured to receive a locking device to determine, at least partially based on at least one wireless communication with a network controller, one or more functions to enable on the mobile device in accordance with a fee plan associated with the mobile device and the network controller.

22. The mobile device of claim 16, wherein the locking device receiving arrangement configured to operate with the display to indicate accessibility to one or more functions of the mobile device comprises:

at least one attachable locking device receiving arrangement configured for receiving at least one of a random access memory, a read-only memory, an optical memory, or a subscriber identity module memory, wherein an attached at least one of a random access memory, read-only memory, optical memory, or subscriber identity module memory is at least partially housed by the housing of the mobile device.

23. The mobile device of claim 16, wherein the circuitry configured for transferring the mobile device from the second mode to the first mode in response to the locking device detached from the mobile device comprises:

circuitry configured for communicating with a network controller operably coupled to a service provider associated with the mobile device, including at least communicating, via a network interface of the mobile device, one or more requests for the service provider to restrict access to one or more functions of the mobile device.

24. A method for a mobile device, comprising:

providing a locking device configured to operate with at least one display of the mobile device to indicate accessibility to one or more functions of the mobile device;

providing a first mode for the mobile device, the first mode including at least (a) allowing telephone calls in accordance with a fee plan associated with the mobile device and (b) disabled access to at least one fee-intensive function of the mobile device;

transferring the mobile device from the first mode to a second mode in response to the locking device attached to the mobile device, the attached locking device at least partially housed by a housing of the mobile device, the second mode including at least enabled access to the at least one fee-intensive function of the mobile device, the transferring including at least activating a skin for the mobile device associated with the second mode, the activated skin enabling a human to perceive, via at least one display of the mobile device altered by the activated skin, that access to the at least one fee-intensive function of the mobile device is enabled without viewing the locking device; and transferring the mobile device from the second mode to the first mode in response to the locking device detached from the mobile device, the mobile device, the transferring including at least deactivating the skin for the mobile device associated with the second mode, the deactivated skin enabling a human to perceive, via the at least one display of the mobile device altered by the deactivated skin, that access to the at least one fee-intensive function of the mobile device is disabled without viewing the locking device.

25. The method of claim 24, wherein providing a locking device configured to operate with at least one display of the mobile device to indicate accessibility to one or more functions of the mobile device comprises:

providing a locking device configured to operate with at least one display of the mobile device to indicate accessibility to one or more fee-intensive functions of the mobile device in accordance with a fee plan associated with the mobile device.

26. The method of claim 24, wherein providing a locking device configured to operate with at least one display of the mobile device to indicate accessibility to one or more functions of the mobile device comprises:
 providing a locking device configured to operate with at least one display of the mobile device to indicate accessibility to one or more fee-intensive functions of the mobile device in accordance with one or more filters of the mobile device.

27. The method of claim 24, wherein providing a locking device configured to operate with at least one display of the mobile device to indicate accessibility to one or more functions of the mobile device comprises:
 providing a locking device configured to operate with at least one display of the mobile device to indicate accessibility to one or more fee-intensive functions of the mobile device in accordance with one or more filters available over a network associated with the mobile device.

28. A mobile device, comprising:
 a processing device;
 a housing;
 a display;
 a locking device receiving arrangement configured to operate with the display to indicate accessibility to one or more functions of the mobile device;
 circuitry configured for providing a first mode for the mobile device, the first mode including at least (a) allowing telephone calls in accordance with a fee plan associated with the mobile device and (b) disabled access to at least one fee-intensive function of the mobile device;
 circuitry configured for transferring the mobile device from the first mode to a second mode in response to the locking device attached to the mobile device, the attached locking device at least partially housed by a housing of the mobile device, the second mode including at least enabled access to the at least one fee-intensive function of the mobile device, the transferring including at least activating a skin for the mobile device associated with the second mode, the activated skin enabling a human to perceive, via at least one display of the mobile device altered by the activated skin, that access to the at least one fee-intensive function of the mobile device is enabled without viewing the locking device; and
 circuitry configured for transferring the mobile device from the second mode to the first mode in response to the locking device detached from the mobile device, the transferring including at least deactivating the skin for the mobile device associated with the second mode, the deactivated skin enabling a human to perceive, via the at least one display of the mobile device altered by the deactivated skin, that access to the at least one fee-intensive function of the mobile device is disabled without viewing the locking device.

29. The mobile device of claim 28, wherein the locking device receiving arrangement configured to operate with the display to indicate accessibility to one or more functions of the mobile device comprises:
 a locking device receiving arrangement for removably receiving at least one computer-readable medium configured as a locking device.

30. The mobile device of claim 28, wherein the locking device receiving arrangement configured to operate with the display to indicate accessibility to one or more functions of the mobile device comprises:
 a locking device receiving arrangement configured to operate with the display to indicate accessibility to one or more functions of the mobile device in conjunction with a self-actuated code configured to at least one of lock or bar functions of the mobile device.

31. The mobile device of claim 28, wherein the locking device receiving arrangement configured to operate with the display to indicate accessibility to one or more functions of the mobile device comprises:
 a locking device receiving arrangement configured to operate with the display to indicate, responsive to the locking device arrangement receiving a locking device, availability of one or more fee-intensive functions of the mobile device in accordance with a fee plan associated with the mobile device.

32. The mobile device of claim 31, further comprising:
 the locking device receiving arrangement configured to operate with the display to indicate, responsive to detection of a vacant locking device arrangement, restricted access to one or more fee-intensive functions of the mobile device in accordance with a fee plan associated with the mobile device.

33. The mobile device of claim 28, further comprising:
 circuitry configured for determining at least one fee-based alternative service capable of providing access to one or more personalized features of the mobile device in response to the locking device detached from the mobile device.

34. The mobile device of claim 28, wherein the locking device receiving arrangement configured to operate with the display to indicate accessibility to one or more functions of the mobile device comprises:
 a locking device receiving arrangement configured to operate with the display to indicate accessibility to one or more functions of the mobile device in accordance with one or more time periods associated with limiting access to at least one fee-intensive function of the mobile device.

35. The mobile device of claim 28, wherein the locking device receiving arrangement configured to operate with the display to indicate accessibility to one or more functions of the mobile device comprises:
 a locking device receiving arrangement configured to operate with the display to indicate a limit imposed on at least one fee-intensive function of the mobile device responsive to detection of a vacant locking device arrangement.

36. The mobile device of claim 28, wherein the locking device receiving arrangement configured to operate with the display to indicate accessibility to one or more functions of the mobile device comprises:
 a locking device receiving arrangement configured to receive an unlocking device, the unlocking device associated with at least one of unlocking or enabling one or more aspects of the mobile device upon receiving of the unlocking device by the locking device receiving arrangement.

37. The mobile device of claim 28, wherein the locking device receiving arrangement configured to operate with the display to indicate accessibility to one or more functions of the mobile device comprises:
 a locking device receiving arrangement configured to (a) facilitate at least one of unlocking or enabling one or more aspects of the mobile device in response to the locking device attached to the mobile device and (b) facilitate at least one of locking or disabling the one or more aspects of the mobile device in response to the locking device detached from the mobile device.

38. A method for a mobile device, comprising:
providing a locking device configured to operate with at least one display of the mobile device to indicate accessibility to one or more functions of the mobile device;
providing a first mode for the mobile device, the first mode including at least (a) allowing telephone calls in accordance with a fee plan associated with the mobile device and (b) disabled access to at least one text messaging function of the mobile device;
transferring the mobile device from the first mode to a second mode in response to the locking device attached to the mobile device, the attached locking device at least partially housed by a housing of the mobile device, the second mode including at least enabled access to the at least one text messaging function of the mobile device, the transferring including at least activating a skin for the mobile device associated with the second mode, the activated skin enabling a human to perceive, via at least one display of the mobile device altered by the activated skin, that access to the at least one text messaging function of the mobile device is enabled without viewing the locking device; and
transferring the mobile device from the second mode to the first mode in response to the locking device detached from the mobile device, the mobile device, the transferring including at least deactivating the skin for the mobile device associated with the second mode, the deactivated skin enabling a human to perceive, via the at least one display of the mobile device altered by the deactivated skin, that access to the at least one text messaging function of the mobile device is disabled without viewing the locking device.

39. A mobile device, comprising:
a processing device;
a housing;
a display;
a locking device receiving arrangement configured to operate with the display to indicate accessibility to one or more functions of the mobile device;
circuitry configured for providing a first mode for the mobile device, the first mode including at least (a) allowing telephone calls in accordance with a fee plan associated with the mobile device and (b) disabled access to at least one text messaging function of the mobile device;
circuitry configured for transferring the mobile device from the first mode to a second mode in response to the locking device attached to the mobile device, the attached locking device at least partially housed by a housing of the mobile device, the second mode including at least enabled access to the at least one text messaging function of the mobile device, the transferring including at least activating a skin for the mobile device associated with the second mode, the activated skin enabling a human to perceive, via at least one display of the mobile device altered by the activated skin, that access to the at least one text messaging function of the mobile device is enabled without viewing the locking device; and
circuitry configured for transferring the mobile device from the second mode to the first mode in response to the locking device detached from the mobile device, the transferring including at least deactivating the skin for the mobile device associated with the second mode, the deactivated skin enabling a human to perceive, via the at least one display of the mobile device altered by the deactivated skin, that access to the at least one text messaging function of the mobile device is disabled without viewing the locking device.

40. A method for a mobile device, comprising:
providing a locking device configured to operate with at least one display of the mobile device to indicate accessibility to one or more functions of the mobile device;
providing a first mode for the mobile device, the first mode including at least (a) allowing telephone calls in accordance with a fee plan associated with the mobile device and (b) disabled Internet access via the mobile device;
transferring the mobile device from the first mode to a second mode in response to the locking device attached to the mobile device, the attached locking device at least partially housed by a housing of the mobile device, the second mode including at least enabled Internet access via the mobile device, the transferring including at least activating a skin for the mobile device associated with the second mode, the activated skin enabling a human to perceive, via at least one display of the mobile device altered by the activated skin, that Internet access via the mobile device is enabled without viewing the locking device; and
transferring the mobile device from the second mode to the first mode in response to the locking device detached from the mobile device, the mobile device, the transferring including at least deactivating the skin for the mobile device associated with the second mode, the deactivated skin enabling a human to perceive, via the at least one display of the mobile device altered by the deactivated skin, that Internet access via the mobile device is disabled without viewing the locking device.

41. A mobile device, comprising:
a processing device;
a housing;
a display;
a locking device receiving arrangement configured to operate with the display to indicate accessibility to one or more functions of the mobile device;
circuitry configured for providing a first mode for the mobile device, the first mode including at least (a) allowing telephone calls in accordance with a fee plan associated with the mobile device and (b) disabled Internet access via the mobile device;
circuitry configured for transferring the mobile device from the first mode to a second mode in response to the locking device attached to the mobile device, the attached locking device at least partially housed by a housing of the mobile device, the second mode including at least enabled Internet access via the mobile device, the transferring including at least activating a skin for the mobile device associated with the second mode, the activated skin enabling a human to perceive, via at least one display of the mobile device altered by the activated skin, that Internet access via the mobile device is enabled without viewing the locking device; and
circuitry configured for transferring the mobile device from the second mode to the first mode in response to the locking device detached from the mobile device, the transferring including at least deactivating the skin for the mobile device associated with the second mode, the deactivated skin enabling a human to perceive, via the at least one display of the mobile device altered by the deactivated skin, that Internet access via the mobile device is disabled without viewing the locking device.

* * * * *